(12) United States Patent
Kemnitz

(10) Patent No.: US 6,675,738 B1
(45) Date of Patent: Jan. 13, 2004

(54) MOBILE LIVESTOCK FEEDER

(76) Inventor: Aaron F. Kemnitz, 215 Feeney Ave., Claire City, SD (US) 57224

(*) Notice: Subject to any disclaimer, the term of this patent is extended or adjusted under 35 U.S.C. 154(b) by 0 days.

(21) Appl. No.: 10/295,239

(22) Filed: Nov. 15, 2002

(51) Int. Cl.7 ................................ B60P 3/04; B61D 49/00
(52) U.S. Cl. ........................................ 119/408; 119/409
(58) Field of Search ................................ 119/408, 400, 119/409, 411, 412, 413, 414, 58, 60, 61

(56) References Cited

U.S. PATENT DOCUMENTS

| | | | | | |
|---|---|---|---|---|---|
| 3,565,044 A | * | 2/1971 | Sorrels | ................ | 119/53 |
| 3,782,333 A | * | 1/1974 | Feterl | ................ | 119/52.4 |
| 3,906,901 A | * | 9/1975 | Cox | ................ | 119/58 |
| 3,949,706 A | * | 4/1976 | Coon, Jr. | ................ | 119/60 |
| 3,999,520 A | * | 12/1976 | Feterl | ................ | 119/58 |
| 4,312,297 A | * | 1/1982 | Roberts | ................ | 119/53 |
| 4,334,502 A | * | 6/1982 | Cox | ................ | 119/53 |
| 5,237,962 A | * | 8/1993 | Garman | ................ | 119/58 |
| D342,700 S | * | 12/1993 | Vernese | ................ | D12/102 |

* cited by examiner

*Primary Examiner*—Charles T. Jordan
*Assistant Examiner*—Judith A Nelson

(57) ABSTRACT

A mobile livestock feeder is provided, comprising a dual-axle gooseneck hitch trailer with two parallel troughs and a storage unit, a hinged gate, a mineral feeder connected to the rear of the trailer, a fly dust bag above the mineral feeder, a fly oil holding tank supplying a rope wick-style automatic oiler, and two heavy duty jacks to level the trailer. The mobile livestock feeder has particular utility in connection with providing a large portable feed capacity along with minerals and fly control.

20 Claims, 4 Drawing Sheets

MOBILE LIVESTOCK FEEDER

BACKGROUND OF THE INVENTION

1. Field of the Invention

The present invention relates to a mobile livestock feeder for use in connection with feeding livestock. The mobile livestock feeder has particular utility in connection with providing a large portable feed capacity along with minerals and fly control.

2. Description of the Prior Art

Mobile livestock feeders are desirable for providing a large portable feed capacity along with minerals and fly control.

The use of livestock feeders is known in the prior art. For example, U.S. Pat. No. 4,312,297 to Roberts discloses a feeder attachment for grain wagons. However, the Roberts '297 patent does not provide a multifunctional livestock feeder with an integral mineral feeder and fly control systems.

U.S. Pat. No. 4,334,502 to Cox discloses a livestock feeder apparatus. However, the Cox '502 patent does not provide a multifunctional livestock feeder with an integral mineral feeder and fly control systems.

U.S. Pat. No. 3,565,044 to Sorrels discloses a portable cattle feeder. However, the Sorrels '044 patent does not provide a multifunctional livestock feeder with an integral mineral feeder and fly control systems.

U.S. Pat. No. 5,237,962 to Garman discloses a portable mobile rack and trough type livestock feeder. However, the Garman '962 patent does not provide a multifunctional livestock feeder with an integral mineral feeder and fly control systems.

U.S. Pat. No. 5,209,183 to Sampson discloses a portable feeder apparatus. However, the Sampson '183 patent does not provide a multifunctional livestock feeder with an integral mineral feeder and fly control systems. Lastly, U.S. Des. Pat. No. 342,700 to Vernese discloses a horse trailer. However, the Vernese '700 patent does not provide a multifunctional livestock feeder with an integral mineral feeder and fly control systems.

While the above-described devices fulfill their respective, particular objectives and requirements, the aforementioned patents do not describe a mobile livestock feeder that provides a large portable feed capacity along with minerals and fly control. The prior art patents make no provision for an integral mineral feeder and fly control systems.

Therefore, a need exists for a new and improved mobile livestock feeder that can be used for providing a large portable feed capacity along with minerals and fly control. In this regard, the present invention substantially fulfills this need. In this respect, the mobile livestock feeder according to the present invention substantially departs from the conventional concepts and designs of the prior art, and in doing so provides an apparatus primarily developed for the purpose of providing a large portable feed capacity along with minerals and fly control.

SUMMARY OF THE INVENTION

In view of the foregoing disadvantages inherent in the known types of livestock feeders now present in the prior art, the present invention provides an improved mobile livestock feeder, and overcomes the above-mentioned disadvantages and drawbacks of the prior art. As such, the general purpose of the present invention, which will be described subsequently in greater detail, is to provide a new and improved mobile livestock feeder and method which has all the advantages of the prior art mentioned heretofore and many novel features that result in a mobile livestock feeder which is not anticipated, rendered obvious, suggested, or even implied by the prior art, either alone or in any combination thereof.

To attain this, the present invention essentially comprises a mobile livestock feeder, comprising a gooseneck hitch trailer comprising at least one trough and at least one storage unit, a mineral feeder connected to the trailer, at least one fly control system connected to the trailer, and at least one heavy duty jack connected to the trailer.

In one embodiment, the present invention comprises a mobile livestock feeder, comprising a gooseneck hitch trailer comprising two parallel troughs and a storage unit, at least one hinged gate connected to the trailer, at least one arm connected to the gooseneck hitch, a mineral feeder connected to the trailer, a fly a dust bag connected to the trailer,fly oil holding tank connected to the trailer, a cattle rub connected to the holding tank, and at least one heavy duty jack connected to the trailer.

In another embodiment, the present invention comprises a mobile livestock feeder, comprising a dual-axle gooseneck hitch trailer comprising two parallel troughs and a storage unit, at least one hinged gate connected to the trailer, two arms connected to the gooseneck hitch, a mineral feeder connected to the trailer, a fly dust bag connected to the trailer, a fly oil holding tank connected to the trailer, tubing connected to the holding tank, a rope wick-style automatic oiler comprising at least one oil pad connected to the tubing, and two heavy duty jacks connected to the trailer.

There has thus been outlined, rather broadly, the more important features of the invention in order that the detailed description thereof that follows may be better understood and in order that the present contribution to the art may be better appreciated.

The invention may also include hinges and other attachments. There are, of course, additional features of the invention that will be described hereinafter and which will form the subject matter of the claims attached.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved mobile livestock feeder that has all of the advantages of the prior art livestock feeders and none of the disadvantages.

It is another object of the present invention to provide a new and improved mobile livestock feeder that may be easily and efficiently manufactured and marketed.

An even further object of the present invention is to provide a new and improved mobile livestock feeder that has a low cost of manufacture with regard to both materials and labor, and which accordingly is then susceptible of low prices of sale to the consuming public, thereby making such mobile livestock feeder economically available to the buying public.

Still another object of the present invention is to provide a new mobile livestock feeder that provides in the apparatuses and methods of the prior art some of the advantages thereof, while simultaneously overcoming some of the disadvantages normally associated therewith.

Even still another object of the present invention is to provide a mobile livestock feeder for providing a large portable feed capacity. This allows more efficient feeding with fewer refills and fewer feeders.

Still yet another object of the present invention is to provide a mobile livestock feeder with an integral mineral feeder and fly control systems. This makes it possible to accomplish multiple tasks simultaneously.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various figures.

DESCRIPTION OF THE PREFERRED EMBODIMENT

Figure 1:
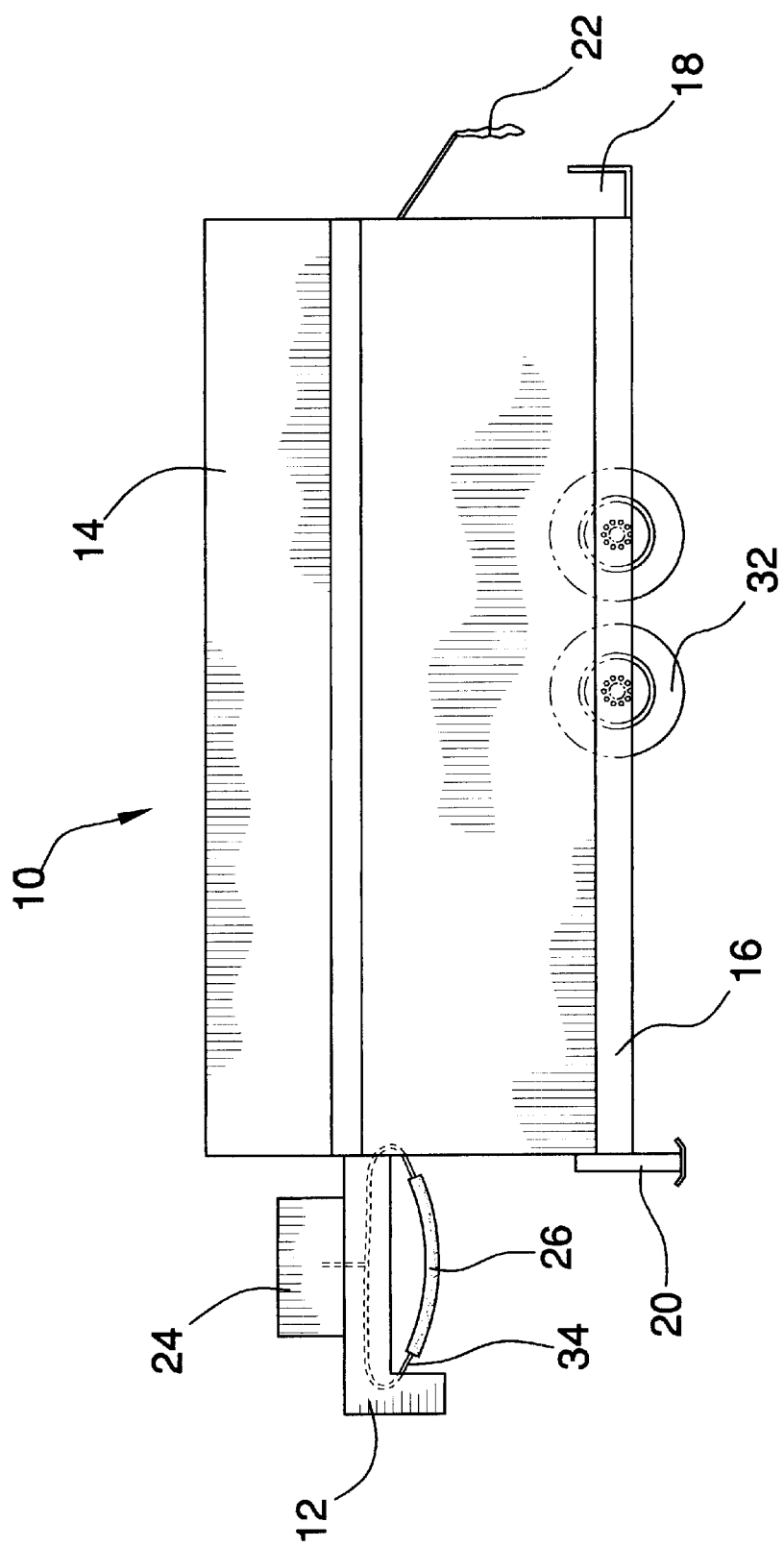
FIG. 1 is a right elevational view of the preferred embodiment of the mobile livestock feeder constructed in accordance with the principles of the present invention.

Referring now to the drawings, and particularly to FIGS. 1–4, a preferred embodiment of the mobile livestock feeder of the present invention is shown and generally designated by the reference numeral 10.

In FIG. 1, a new and improved mobile livestock feeder 10 of the present invention for providing a large portable feed capacity along with minerals and fly control is illustrated and will be described. More particularly, the mobile livestock feeder 10 comprises a dual-axle gooseneck hitch 12 trailer 14 comprising two parallel troughs 16 and a storage unit, a mineral feeder 18 connected to the rear of the trailer 14, a fly dust bag 22 connected to the trailer 14 above the mineral feeder 18, a fly oil holding tank 24 connected to the front of the trailer 14, tubing 34 connecting the holding tank 24 to a rope wick-style automatic oiler having at least one oil pad 26 at the front of the trailer 14, and two heavy duty jacks 20 connected to the front of the trailer 14 and leveling the trailer along with the wheels 32.

Figure 2:
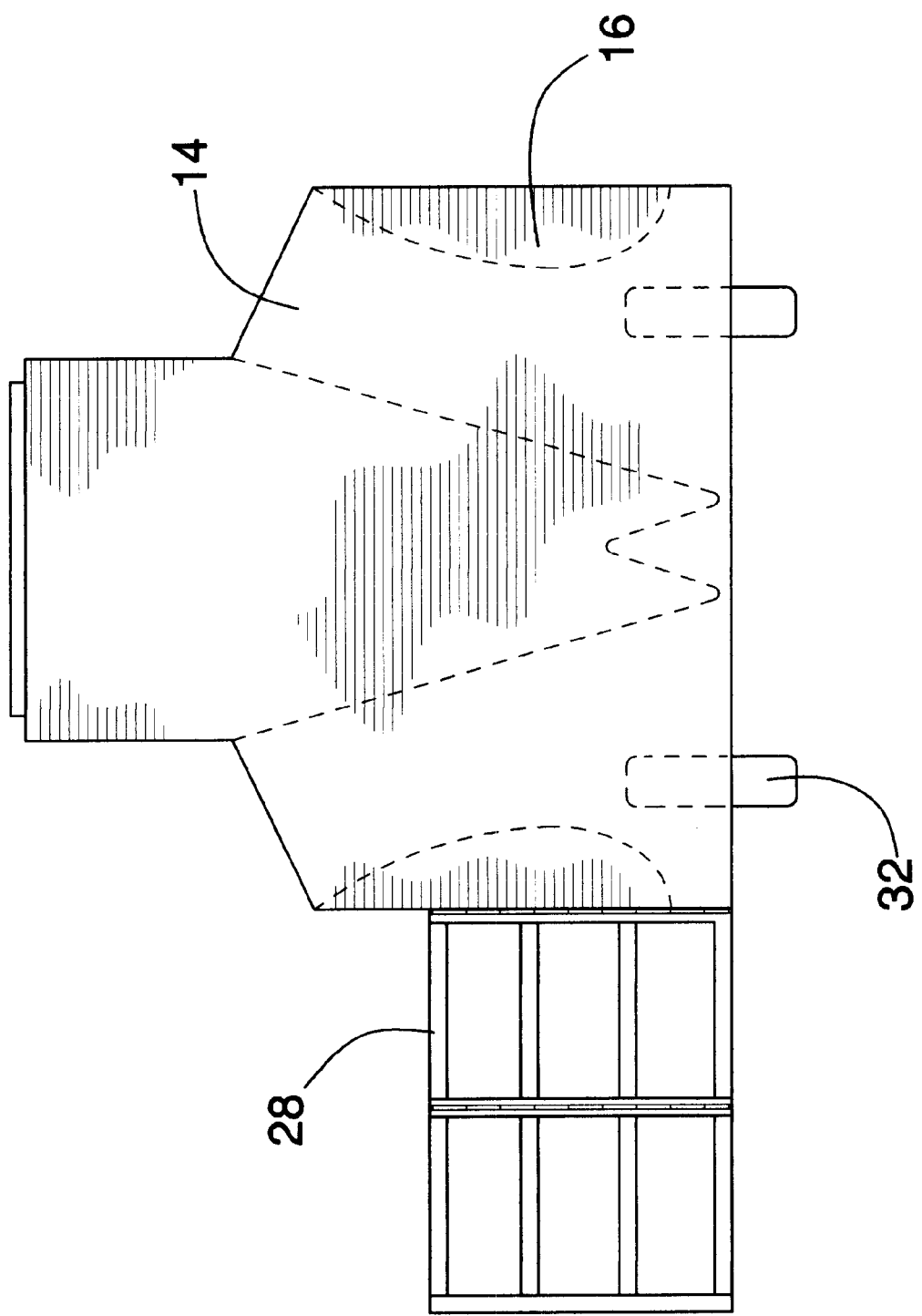
FIG. 2 is a rear elevational view of the mobile livestock feeder of the present invention.

FIG. 2 is a rear elevational view of the mobile livestock feeder of the present invention, and illustrates the trailer 14 with troughs 16, wheels 32, and a hinged gate 28 connected to the rear of the trailer 14 at the side.

Figure 3:
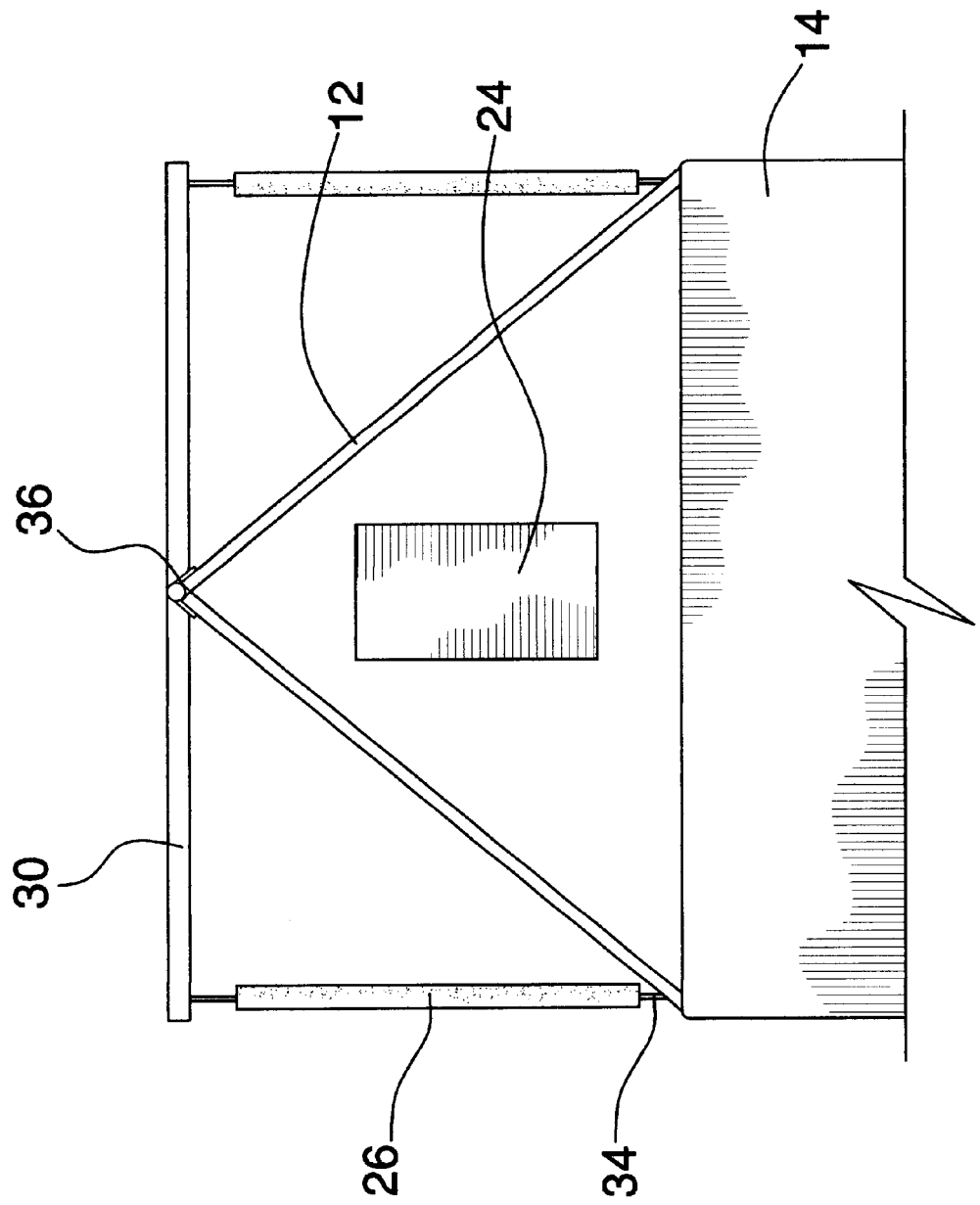
FIG. 3 is a plan view of the front portion of the mobile livestock feeder of the present invention.

FIG. 3 is a plan view of the front portion of the mobile livestock feeder of the present invention, and illustrates the front of the trailer 14 with the gooseneck hitch 12, two arms 30 connected to the gooseneck hitch 12 with a hinge 36, and the fly oil holding tank 24 with tubing 34 connecting to two oil pads 26 supported by the arms 30.

Figure 4:
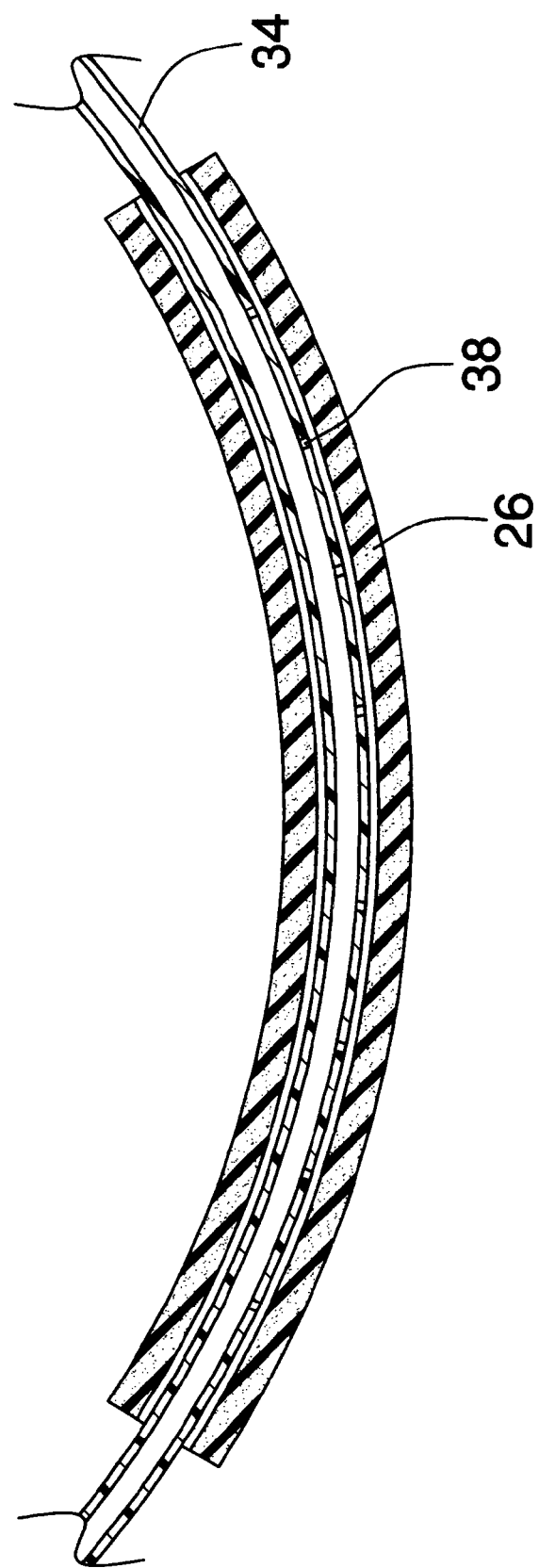
FIG. 4 is an enlarged cross-sectional view of an oil pad of the mobile livestock feeder of the present invention.

FIG. 4 is an enlarged cross-sectional view of an oil pad 26 of the mobile livestock feeder of the present invention, and illustrates the tubing 34 with perforations 38 supplying the oil pad 26 with fly oil.

The mobile livestock feeder of the present invention is an improved mobile cattle feeder design. It employs a dual-axle, gooseneck trailer-style configuration with hinged gates that fold sideways instead of lifting up for transport. Two arms hinged on the top and center of the gooseneck fold out and are locked when in use, and fold back to the gooseneck when not in use. The actual feeder is similar to conventional units but is longer and holds more feed, and comprises a sheet metal, C channel, and tubing-based structure with transverse access ports to a pair of parallel troughs and an upper, central holder for feed. In one embodiment, its dimensions include a length of about 18 feet and a width of about 8 feet. The lower rear end of the unit features a small trough that serves as a mineral feeder. Above this is a fly dust bag. A rope wick-style automatic oiler is suspended from the underside of the gooseneck hitch in an axial orientation. A holding tank for fly oil is connected to the hitch with a bracket. The tank has a valve and is connected to perforated tubing that runs through and supplies the oiling pads. The lower front end of the trailer is equipped with a pair of suitably heavy-duty jacks that, along with the wheels, hold the unit level.

The mobile livestock feeder of the present invention fulfills the need for a new type of livestock feeder design. The appealing features of the mobile livestock feeder include its large capacity, versatility, convenience, and efficiency. The large size of this feeder minimizes the need for refilling and in many instances eliminates the need for an additional feeder, yet it can be easily moved and set up by one person. Its integral mineral feeder and fly control systems eliminate the need to deploy separate examples of such items in the field, thereby saving time and boosting productivity.

In one embodiment, the mobile livestock feeder of the present invention comprises a portable cattle feeder with a trailer, including an enhanced goose-neck hitch associated therewith, whereby the present invention includes a mineral feed apparatus built into the rear portion thereof with a fly dust bag positioned thereabove, such that the goose-neck can further support a cattle rub with a remote tank for dispensing fly spray. The mobile livestock feeder thus provides a mobile, multifunctional livestock feeder with an integral mineral feeder and fly control systems with particular utility for farmers and ranchers.

In use, it can now be understood that the mobile livestock feeder of the present invention has particular utility in connection with providing a large portable feed capacity along with minerals and fly control.

While a preferred embodiment of the mobile livestock feeder has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. For example, any suitable sturdy material such as metal, plastic, composite material, or a variety of wood may be used instead of the sheet metal described. Although feed such as creep feed has been anticapted for use with this design, and sort of livestock feed, grains, granules or hay may be employed. Also, the tubing may be made of rubber, plastic, or similar material. And although providing a large portable feed capacity along with minerals and fly control has been described, it should be appreciated that the mobile livestock feeder herein described is also suitable for transporting other needed farm or ranch items. Furthermore, a wide variety of feeder and fly control configurations may be used instead of those described.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A mobile livestock feeder, comprising:
   a gooseneck hitch trailer comprising at least one trough and at least one storage unit;
   a mineral feeder connected to said trailer;
   at least one fly control system connected to said trailer; and
   at least one heavy duty jack connected to said trailer.

2. The mobile livestock feeder of claim 1, wherein said fly control system comprises a fly dust bag.

3. The mobile livestock feeder of claim 1, wherein said fly control system comprises a fly oil holding tank connected to a cattle rub.

4. The mobile livestock feeder of claim 3, wherein said cattle rub comprises a rope wick-style automatic oiler comprising at least one oil pad.

5. The mobile livestock feeder of claim 1, further comprising at least one hinged gate connected to said trailer.

6. The mobile livestock feeder of claim 1, further comprising at least one arm connected to said gooseneck hitch.

7. The mobile livestock feeder of claim 1, wherein said fly control system is above said mineral feeder.

8. The mobile livestock feeder of claim 1, further comprising at least two wheels connected to said trailer, wherein said jack and said wheels hold said trailer substantially level.

9. A mobile livestock feeder, comprising:
   a gooseneck hitch trailer comprising two parallel troughs and a storage unit;
   at least one hinged gate connected to said trailer;
   at least one arm connected to said gooseneck hitch;
   a mineral feeder connected to said trailer;
   a fly dust bag connected to said trailer;
   a fly oil holding tank connected to said trailer;
   a cattle rub connected to said holding tank; and
   at least one heavy duty jack connected to said trailer.

10. The mobile livestock feeder of claim 9, further comprising tubing connecting said cattle rub to said holding tank.

11. The mobile livestock feeder of claim 9, wherein said cattle rub comprises a rope wick-style automatic oiler comprising at least one oil pad.

12. The mobile livestock feeder of claim 9, further comprising a hinge connecting said arm to said gooseneck hitch.

13. The mobile livestock feeder of claim 9, wherein said fly dust bag is above said mineral feeder.

14. The mobile livestock feeder of claim 9, further comprising at least two wheels connected to said trailer, wherein said jack and said wheels hold said trailer substantially level.

15. A mobile livestock feeder, comprising:
   a dual-axle, gooseneck hitch trailer comprising two parallel troughs and a storage unit;
   at least one hinged gate connected to said trailer;
   two arms connected to said gooseneck hitch;
   a mineral feeder connected to said trailer;
   a fly dust bag connected to said trailer;
   a fly oil holding tank connected to said trailer;
   tubing connected to said holding tank;
   a rope wick-style automatic oiler comprising at least one oil pad connected to said tubing; and
   two heavy duty jacks connected to said trailer.

16. The mobile livestock feeder of claim 15, further comprising a hinge connecting said arms to said gooseneck hitch.

17. The mobile livestock feeder of claim 15, wherein said arms are foldable and lockable.

18. The mobile livestock feeder of claim 15, wherein said fly dust bag is above said mineral feeder.

19. The mobile livestock feeder of claim 15, wherein said tubing is perforated.

20. The mobile livestock feeder of claim 15, further comprising at least four wheels connected to said dual-axles, wherein said jacks and said wheels hold said trailer substantially level.

* * * * *